US009431832B2

(12) United States Patent
Ichikawa et al.

(10) Patent No.: US 9,431,832 B2
(45) Date of Patent: Aug. 30, 2016

(54) STATIONARY ELECTRICAL STORAGE SYSTEM AND CONTROL METHOD

(71) Applicants: Koichi Ichikawa, Kasugai (JP); Yasuhiro Takahashi, Miyoshi (JP)

(72) Inventors: Koichi Ichikawa, Kasugai (JP); Yasuhiro Takahashi, Miyoshi (JP)

(73) Assignee: TOYOTA JIDOSHA KABUSHIKI KAISHA, Aichi-ken (JP)

(*) Notice: Subject to any disclaimer, the term of this patent is extended or adjusted under 35 U.S.C. 154(b) by 271 days.

(21) Appl. No.: 14/184,152

(22) Filed: Feb. 19, 2014

(65) Prior Publication Data

US 2014/0239908 A1    Aug. 28, 2014

(30) Foreign Application Priority Data

Feb. 25, 2013    (JP) ................. 2013-034279

(51) Int. Cl.
*H02J 7/00* (2006.01)

(52) U.S. Cl.
CPC .......... *H02J 7/0016* (2013.01); *Y02T 10/7055* (2013.01)

(58) Field of Classification Search
CPC .................................. H02J 7/0016
USPC ...................................... 320/134
See application file for complete search history.

(56) References Cited

U.S. PATENT DOCUMENTS

| 6,642,692 B2* | 11/2003 | Kinoshita | ............ | H02J 7/0014 320/112 |
| 7,541,781 B2* | 6/2009 | Gamboa | ............... | H02J 7/0031 320/141 |
| 2006/0012330 A1 | 1/2006 | Okumura et al. | | |
| 2009/0179609 A1* | 7/2009 | Fasse | ................ | H01M 8/04373 320/101 |
| 2011/0078092 A1* | 3/2011 | Kim | .................... | B60L 11/1824 705/412 |
| 2013/0009605 A1 | 1/2013 | Hongo et al. | | |
| 2013/0106356 A1 | 5/2013 | Nakao et al. | | |
| 2014/0159665 A1 | 6/2014 | Boehm et al. | | |

FOREIGN PATENT DOCUMENTS

| CN | 102388499 A | 3/2012 |
| CN | 202455134 U | 9/2012 |
| JP | 2001177918 A | 6/2001 |
| JP | 2001314046 A | 11/2001 |
| JP | 2003219570 A | 7/2003 |
| JP | 2004-185915 A | 7/2004 |
| JP | 2008160993 A | 7/2008 |
| JP | 2012010563 A | 1/2012 |
| WO | 2012028427 A1 | 3/2012 |

* cited by examiner

*Primary Examiner* — Jack Chiang
*Assistant Examiner* — Brandon Bowers
(74) *Attorney, Agent, or Firm* — Sughrue Mion, PLLC

(57) ABSTRACT

A stationary electrical storage system includes: a stationary storage battery including nickel metal hydride secondary batteries; and a controller repeatedly carrying out charging with an external power supply and discharging to supply electric power to a load, stopping discharging to the load when an SOC of any secondary battery has become a first threshold, and stopping charging from the external power supply when an SOC of any secondary battery has become a second threshold. The controller additionally charges the whole stationary storage battery such that the secondary battery other than the secondary battery having the lowest SOC is allowed to be charged to a fully charged level beyond the second threshold by not stopping charging when the SOC of the any secondary battery has become the second threshold and the SOC of the secondary battery having the lowest SOC becomes higher than or equal to the second threshold.

6 Claims, 5 Drawing Sheets

STATIONARY ELECTRICAL STORAGE SYSTEM AND CONTROL METHOD

INCORPORATION BY REFERENCE

The disclosure of Japanese Patent Application No. 2013-034279 filed on Feb. 25, 2013 including the specification, drawings and abstract is incorporated herein by reference in its entirety.

BACKGROUND OF THE INVENTION

1. Field of the Invention

The invention relates to charging and discharging control over a stationary electrical storage system.

2. Description of Related Art

Japanese Patent Application Publication No. 2004-185915 (JP 2004-185915 A) describes a replacement method in which part of a plurality of cells that constitute a battery pack is replaced with a replacement new cell. With this replacement method, the battery pack is allowed to be used without carrying out a post-replacement equalizing process by charging the new cell to a charged level lower than those of the cells other than the replacement-target unit cell.

However, charging efficiencies are different between the replaced new cell and each of the non-replaced old cells and between the old cells due to a difference in cell degradation, and the like. Therefore, there may be variations in charged level (SOC) among the cells that constitute the battery pack as a result of repetition of charging and discharging.

Particularly, different from a battery pack that outputs energy that is used to cause a vehicle to travel, a stationary storage battery has a wide usage range of the charged level (difference between an SOC upper limit value and an SOC lower limit value). If the usage range of the charged level is wide, the influence of the difference in charging efficiency further increases, and variations in the charged level tend to increase. Different from the vehicle battery that allows a large output at a time, in the stationary storage battery for which importance is placed on supplying electric power stably for a certain period, if variations in the charged level among the cells increase as a result of repetition of charging and discharging and the chargeable and dischargeable usage range reduces, it may not be able to exercise sufficient performance as the stationary storage battery.

In addition, in recent years, there is an effort to reuse a battery pack, mounted on a hybrid vehicle or an electric vehicle, as a stationary storage battery, and the used battery pack mostly has a difference in charging efficiency due to cell degradation and the like. Therefore, there is a possibility that the performance of the stationary storage battery cannot be sufficiently extracted and the used battery pack cannot be reused so as to fully use the battery pack.

SUMMARY OF THE INVENTION

The invention provides a stationary electrical storage system that is able to suppress a decrease in the performance of a stationary storage battery due to variations in charged level among a plurality of nickel metal hydride secondary batteries that constitute the stationary storage battery.

A first aspect of the invention includes: a stationary storage battery including a plurality of nickel metal hydride secondary batteries connected in series with each other and configured to supply electric power to a load; and a controller configured to repeatedly execute charging control with the use of an external power supply and discharging control in order to supply electric power to the load. The controller is configured to stop discharging the stationary storage battery to the load when an SOC of any one of the nickel metal hydride secondary batteries has become a first threshold, and the controller is configured to stop charging the stationary storage battery from the external power supply when an SOC of any one of the nickel metal hydride secondary batteries has become a second threshold.

The controller is configured to additionally charge the whole stationary storage battery in charging control with the use of the external power supply such that: the nickel metal hydride secondary battery other than the nickel metal hydride secondary battery having the lowest SOC is allowed to be charged to a fully charged level beyond the second threshold by not stopping charging when the SOC of the any one of the nickel metal hydride secondary batteries has become the second threshold; and the SOC of the nickel metal hydride secondary battery having the lowest SOC becomes higher than or equal to the second threshold.

According to the first aspect of the invention, it is possible to reduce the span of variations in SOC between the plurality of nickel metal hydride secondary batteries that constitute the stationary storage battery within the range between the fully charged level and the second threshold through additional charging such that the variations in SOC are eliminated. Therefore, it is possible to suppress a reduction in the SOC usage range between the first threshold and the second threshold, in which charging and discharging are allowed, so it is possible to suppress a decrease in the battery performance of the stationary electrical storage system due to variations in SOC.

The controller may be configured to additionally charge the whole stationary storage battery until the SOC of the nickel metal hydride secondary battery having the lowest SOC reaches the fully charged level beyond the second threshold. With this configuration, it is possible to equalize the SOC of each of the nickel metal hydride secondary batteries at the fully charged level (the SOC is 100%), so it is possible to eliminate variations in SOC.

The controller may be configured to carry out charging at a first charging rate until the SOC of the nickel metal hydride secondary batteries becomes the second threshold in the charging control, and the controller may be configured to carry out charging at a second charging rate lower than the first charging rate from when the SOC of the nickel metal hydride secondary batteries has become the second threshold to when the SOC of the nickel metal hydride secondary battery reaches the fully charged level. With this configuration, for example, it is possible to appropriately carry out charging to the fully charged level beyond the second threshold while suppressing heat generation of the nickel metal hydride secondary batteries due to overcharging.

The stationary electrical storage system may further include a voltage sensor configured to detect a voltage value of each of the nickel metal hydride secondary batteries; and a current sensor configured to detect a current value flowing through the nickel metal hydride secondary batteries. The controller may be configured to determine the first nickel metal hydride secondary battery that has reached a voltage value corresponding to the first threshold on the basis of a prescribed correspondence map between the SOC of each nickel metal hydride secondary battery and the voltage value, and to stop discharging, the controller may be configured to determine the second nickel metal hydride secondary battery that has reached a voltage value corresponding to the second threshold on the basis of the correspondence map, and to stop charging, and the controller may be configured to additionally charge the whole stationary storage battery when an SOC difference between the first nickel metal hydride secondary battery and the second nickel metal hydride secondary battery is larger than or equal to a predetermined value. By carrying out additional charging in response to the SOC difference as a trigger, a reduction in the SOC usage range between the first threshold and the second threshold due to variations in SOC is periodically eliminated, so it is possible to appropriately maintain the battery performance of the stationary electrical storage system.

The controller may be configured to calculate the SOC of the second nickel metal hydride secondary battery at the time when the SOC of the first nickel metal hydride secondary battery has reached the first threshold on the basis of a charging and discharging current accumulated value from when discharging is started to when the SOC of the first nickel metal hydride secondary battery reaches the first threshold in the discharging control. With this configuration, it is possible to accurately calculate the current SOC of the second nickel metal hydride secondary battery, which has decreased from the second threshold.

The controller may be configured to additionally charge the whole stationary storage battery such that the second nickel metal hydride secondary battery is charged with an amount of electric power corresponding to the SOC difference after the second nickel metal hydride secondary battery has been charged to the second threshold. With this configuration, it is possible to carry out charging with electric power for eliminating (reducing) variations in SOC between the nickel metal hydride secondary batteries in just proportion, and it is possible to, for example, reduce an increase in temperature (heat generation) of each of the nickel metal hydride secondary batteries due to overcharging by suppressing excessive charging.

A second aspect of the invention provides a control method for a stationary storage battery including a plurality of nickel metal hydride secondary batteries connected in series with each other and configured to supply electric power to a load. The control method includes executing discharging control to the load, and stopping discharging the stationary storage battery to the load when an SOC of any one of the nickel metal hydride secondary batteries has become a first threshold; executing charging control with the use of an external power supply, and stopping charging the stationary storage battery from the external power supply when an SOC of any one of the nickel metal hydride secondary batteries has become a second threshold; repeatedly executing the charging control with the use of the external power supply and the discharging control in order to supply electric power to the load; and additionally charging the overall stationary storage battery in the charging control such that the nickel metal hydride secondary battery other than the nickel metal hydride secondary battery having the lowest SOC is allowed to be charged to a fully charged level beyond the second threshold by not stopping charging when the SOC of the any one of the nickel metal hydride secondary batteries has become the second threshold and the SOC of the nickel metal hydride secondary battery having the lowest SOC becomes higher than or equal to the second threshold. According to the second aspect of the invention, a similar advantageous effect to that of the first aspect of the invention is obtained.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

Hereinafter, an embodiment of the invention will be described.

First Embodiment

Figure 1:
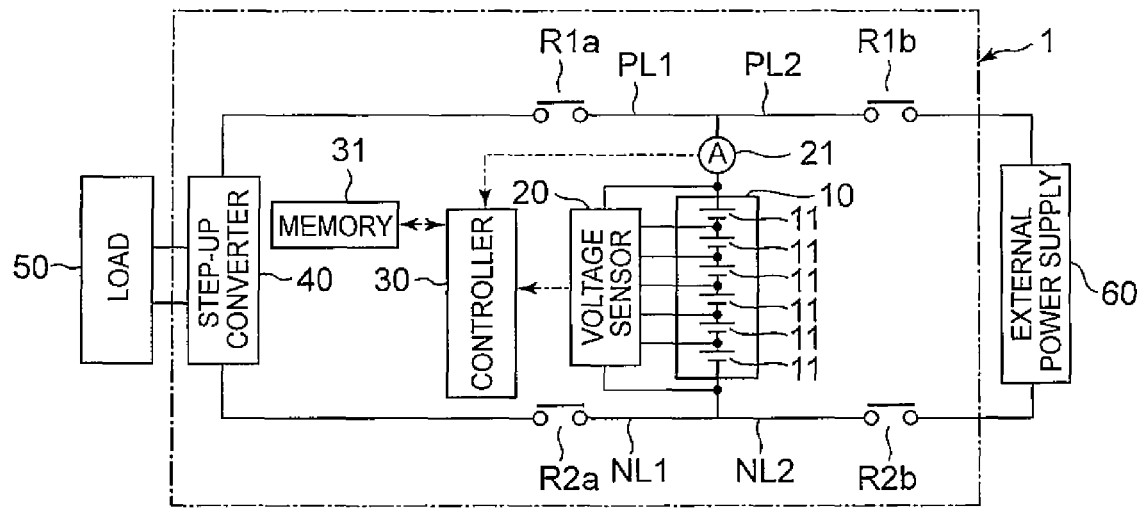
FIG. 1 is a view that shows the system configuration of a stationary electrical storage system.

A stationary electrical storage system according to a first embodiment of the invention will be described with reference to FIG. 1 to FIG. 8. FIG. 1 is a system configuration view of the stationary electrical storage system 1.

The stationary electrical storage system 1 is, for example, used as a stationary power supply that is used at a shop, a factory, a house, or the like, and is connected to a load 50 (electric power consumption device) of a house, or the like. In addition, the stationary electrical storage system 1 is connected to an external power supply, and is able to supply electric power to the electric power consumption device (is able to be discharged) and to be charged with electric power that is supplied from an external power supply 60.

The electric power consumption device, for example, includes a home electric appliance, an air conditioner, an equipment instrument, and the like. The external power supply 60, for example, includes a photovoltaic power generator (photovoltaic panel), a self-power generator, a commercial electric power that is supplied via a power transmission line, and the like.

A battery pack 10 (which corresponds to an electrical storage device) includes a plurality of unit cells (which correspond to electrical storage elements) 11 connected in series with one another. A nickel metal hydride secondary battery is used as each unit cell 11. The number of the unit cells 11 may be set as needed on the basis of a required output of the battery pack 10, and the like. In the battery pack 10 according to the present embodiment, all the unit cells 11 are connected in series with one another. Instead, the battery pack 10 may include a plurality of unit cells 11 connected in parallel with each other.

In addition, the battery pack 10 (unit cells 11) according to the present embodiment includes not only a new battery pack 10 but also a used (secondhand) battery pack 10 that has been mounted on a vehicle, such as a hybrid vehicle and an electric vehicle. The used battery pack 10 includes a rebuilt battery pack that is reconstructed by gathering the unit cells 11 from among the plurality of used battery packs 10 or reconstructed by replacing part of the unit cells 11 of the used battery pack 10 with the unit cells 11 of a new or another used battery pack 10.

The battery pack 10 is connected to a step-up converter 40 via a positive electrode line PL1 and a negative electrode line NL1. The positive electrode line PL1 is connected to a positive electrode terminal of the battery pack 10. The negative electrode line NL1 is connected to a negative electrode terminal of the battery pack 10. A relay device R1a is provided in the positive electrode line PL1, and a relay device R2a is provided in the negative electrode line NL1.

In addition, the battery pack 10 is connected to the external power supply 60 via a positive electrode line PL2 and a negative electrode line NL2. The positive electrode line PL2 is connected to the positive electrode terminal. The negative electrode line NL2 is connected to the negative electrode terminal. A relay device R1b is provided in the positive electrode line PL2. A relay device R2b is provided in the negative electrode line NL2.

The step-up converter 40 is connected to the load 50. The step-up converter 40 is able to step up or step down the output voltage of the battery pack 10 and to supply the stepped-up or stepped-down electric power to the load 50. It is possible to supply direct-current or alternating-current power to the load 50. When alternating-current power is supplied, an inverter is provided between the step-up converter 40 and the load 50.

The external power supply 60 supplies external electric power to the battery pack 10. In the example of FIG. 1, the battery pack 10 is directly connected to the external power supply 60. Instead, charging electric power may be configured to be supplied from the external power supply 60 to the battery pack 10 via the step-up converter 40, the inverter, or the like.

A voltage sensor 20 detects a terminal voltage of the battery pack 10 and a voltage of each of the serially connected unit cells 11 that constitute the battery pack 10, and outputs the detected results to a controller 30. A current sensor 21 detects a charging or discharging current for charging or discharging the battery pack 10, and outputs the detected result to the controller 30.

In addition, the current sensor 21 is able to detect an external charging current flowing through the battery pack 10 via the external power supply 60 and to output the detected result to the controller 30. The current sensor 21 according to the present embodiment is provided in a current path of the external charging current that is output from the external power supply 60 to the battery pack 10, and is provided in a current path along which the external charging current flows through the battery pack 10 while the relay devices R1a, R2a are in an off state, that is, in a state where the battery pack 10 is disconnected from the load 50. It is also applicable that a current sensor that detects an external charging current flowing through the battery pack 10 via the external power supply 60 and a current sensor that detects a current flowing through the battery pack 10 in charging and discharging control over the battery pack 10 are individually provided and separately detect currents.

The controller 30 is a control unit that governs control over the whole stationary electrical storage system 1, and is a control device that executes processes required for charging and discharging control, such as an SOC estimation process and an external charging process via the external power supply 60, together with charging and discharging control over the battery pack 10. The controller 30 is able to calculate the SOC of the battery pack 10 (unit cells 11) on the basis of a voltage value detected by the voltage sensor 20 and a current value detected by the current sensor 21, and is able to execute charging and discharging control over the battery pack 10 on the basis of the calculated SOC and a fully charged level. A memory 31 is storage means for storing various pieces of information.

The controller 30 acquires the voltage value of the battery pack 10 and the voltage value of each unit cell 11, which are detected by the voltage sensor 20, and the current value that is detected by the current sensor 21 at predetermined timing or predetermined time intervals in a period from when the stationary electrical storage system 1 starts charging and discharging control to when charging and discharging control ends. The controller 30 executes the SOC estimation process for estimating the SOC of the battery pack 10 (unit cells 11) on the basis of the acquired CCV. The calculated values, the detected values, and the like, are used in charging and discharging control, and are stored in the memory 31.

The controller 30 may be configured to individually include a controller for executing the SOC estimation process and a controller for executing the external charging process. That is, a central control unit that governs control over the stationary electrical storage system 1 may be configured to control various portions. Alternatively, an individual controller may be provided for control over each portion, and the central control unit may be configured to be connected to the individual controllers.

The SOC of the battery pack 10 (unit cells 11) indicates the percentage (state of charge) of a current charged level to a fully charged level of the battery pack 10, and the fully charged level indicates a full charge state (the SOC is 100%). The SOC is determined from an open circuit voltage (OCV) of the battery pack 10. For example, an SOC-OCV map may be stored in the memory 31 in advance as correspondence relationship data between the SOC and OCV of the battery pack 10. The controller 30 is able to calculate the OCV of the battery pack 10 from the voltage (closed circuit voltage (CCV)) that is detected by the voltage sensor 20, and to calculate the SOC from the SOC-OCV map.

The correspondence relationship between the SOC and OCV of the battery pack 10 varies with a battery temperature. Therefore, the SOC-OCV map may be stored in the memory 31 for each battery temperature, and, when the SOC is estimated on the basis of the OCV of the battery pack 10, the SOC-OCV map may be changed (selected) on the basis of the battery temperature that is detected by a temperature sensor (not shown) and then the SOC of the battery pack 10 may be estimated.

The controller 30 is able to acquire an overcharged state or overdischarged state of the battery pack 10 by monitoring the voltage value (CCV) detected by the voltage sensor 20 during charging or discharging. For example, charging and discharging control may be executed to limit charging of the battery pack 10 such that the calculated SOC does not become higher than a predetermined SOC upper limit value (for example, a charge end voltage corresponding to the fully charged level) or limit discharging of the battery pack 10 such that the calculated SOC does not become lower than an SOC lower limit value (for example, a discharge end voltage set for a state where the charged level is zero (0%)).

In addition, the controller 30 may execute an SOC estimation process that uses an accumulated value of the charging and discharging currents of the battery pack 10, other than the above-described calculation method that uses the SOC-OCV map, as a method of calculating the SOC of the battery pack 10 (unit cells 11).

The controller 30 executes the process of accumulating the charging and discharging currents during charging and discharging control, and stores the charging and discharging current accumulated value in the memory 31 as a charging and discharging history. For example, the detected value that is detected by the current sensor 21 is accumulated as a positive value for a discharging current and a negative value for a charging current, and it is possible to calculate the charging and discharging current accumulated value.

The SOC of the battery pack 10 (unit cells 11) indicates the amount of electric power (Ah) stored with respect to the fully charged level. That is, the amount of electric power stored in the battery pack 10 and the SOC have a correspondence relationship, so it is possible to acquire a change of the SOC from a predetermined SOC to a current SOC from the charging and discharging current accumulated value. For example, the amount of discharged electric power is acquired by accumulating a discharging current when the battery pack 10 is discharged from a state where the SOC is 90%. It is possible to calculate the current charged level (Ah), that is, the current SOC, by acquiring the charged level (Ah) at the SOC of 90% in advance and then subtracting the amount of discharged electric power, corresponding to the current accumulated value, from the charged level at the SOC of 90%.

Figure 2:
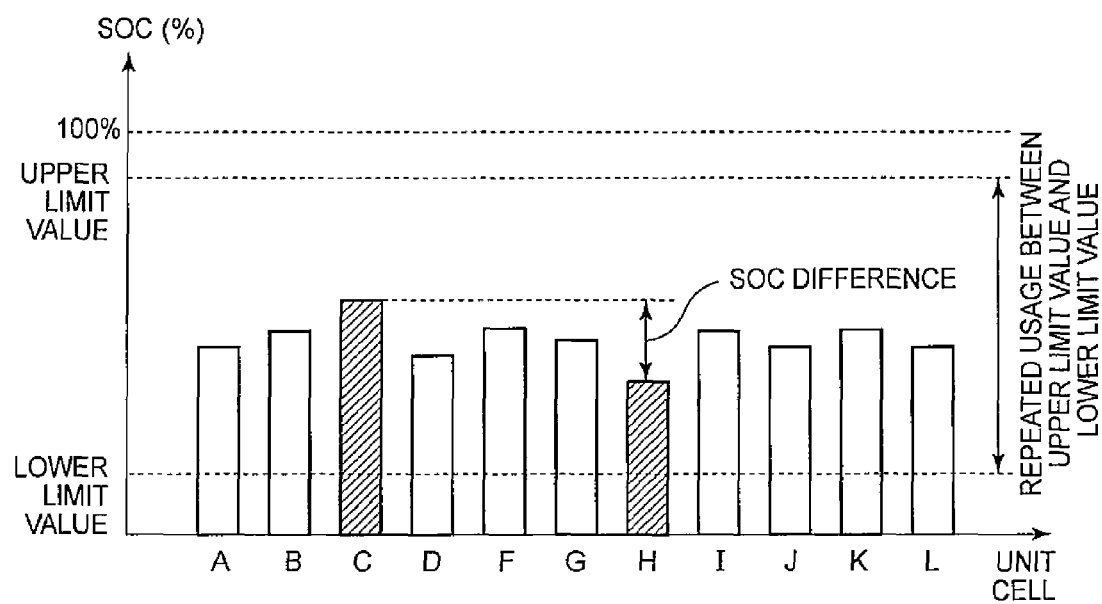
FIG. 2 is a graph that shows a usage mode of a battery pack in the stationary electrical storage system and an example of variations in SOC among a plurality of unit cells that constitute the battery pack.

Next, charging and discharging control over the stationary electrical storage system 1 according to the present embodiment will be described. FIG. 2 is a graph that shows a usage mode of the battery pack 10 in the stationary electrical storage system 1 and an example of variations in SOC among the plurality of unit cells 11 that constitute the battery pack 10.

A vehicle battery is, for example, used in the range of 30 to 70% in SOC, whereas the stationary electrical storage system 1 is basically allowed to be used in the range of 0 to 100% in SOC and is used in the range of 10 to 90% in SOC even when an overcharged state or an overdischarged state is considered in view of battery protection. That is, the stationary electrical storage system 1 differs from the vehicle battery in usage purpose and usage method.

A vehicle-mounted battery that stores electric power that is supplied to a vehicle drive motor allows a large output at a time in response to a vehicle request, so the current value momentarily varies during charging or discharging, fluctuations in the current value are extremely large, and voltage fluctuations are relatively small. That is, this is the usage mode in which it is possible to exercise sufficient battery performance even when the SOC usage range is a narrow range like the range of 30 to 70%. Therefore, even when the usage range reduces due to variations in SOC among the unit cells 11, a decrease in battery performance is small with respect to a vehicle request.

In contrast to this, in the stationary electrical storage system 1, importance is placed on supplying stable electric power to the load 50 for a certain period, so charging or discharging is carried out at a constant current. That is, by carrying out charging or discharging at a constant current in the wide SOC range of 10 to 90%, supplying stable electric power for a certain period is achieved, and fluctuations in the current value are small and voltage fluctuations are relatively large as compared to those of the vehicle battery. Thus, in the stationary electrical storage system 1 that achieves stable electric power supply by using a wide range of SOC like 10 to 90%, if the usage range reduces due to variations in SOC among the unit cells 11, a decrease in battery performance increases with respect to stable electric power supply required for the stationary electrical storage system 1.

As shown in FIG. 2, in the stationary electrical storage system 1, for example, charging and discharging of the battery pack 10 are controlled on the condition that an SOC upper limit value preset against overcharging is 90% and an SOC lower limit value preset against overdischarging is 10%. Discharging is allowed until the SOC reaches 10%, and charging is allowed until the SOC of the battery pack 10 reaches 90%. The battery pack 10 repeatedly undergoes constant current discharging to the SOC lower limit value and constant current charging to the SOC upper limit value with the use of the external power supply 60 in a change of the SOC within the usage range larger than that of the vehicle battery.

Figure 3:
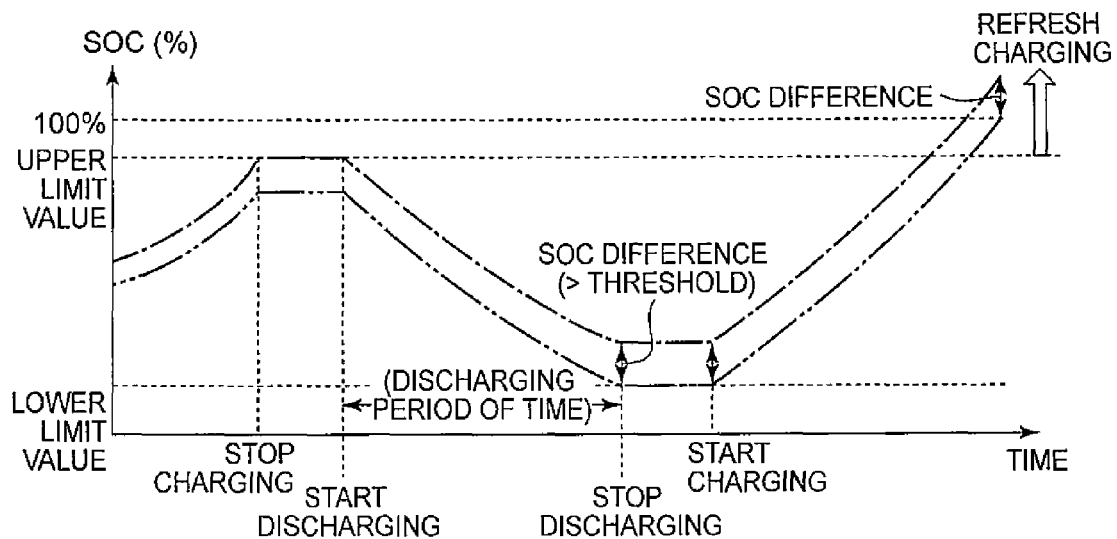
FIG. 3 is a graph that shows a change in SOC in charging and discharging control over the stationary electrical storage system.

FIG. 3 is a graph that shows a change in SOC in charging and discharging control over the stationary electrical storage system 1. In charging control and discharging control over the battery pack 10, the controller 30 executes charging and discharging control within the usage range from the SOC upper limit value to the SOC lower limit value by determining whether the SOC of each unit cell 11 has reached the SOC upper limit value or the SOC lower limit value on the basis of the voltage value of each unit cell 11.

Figure 4:
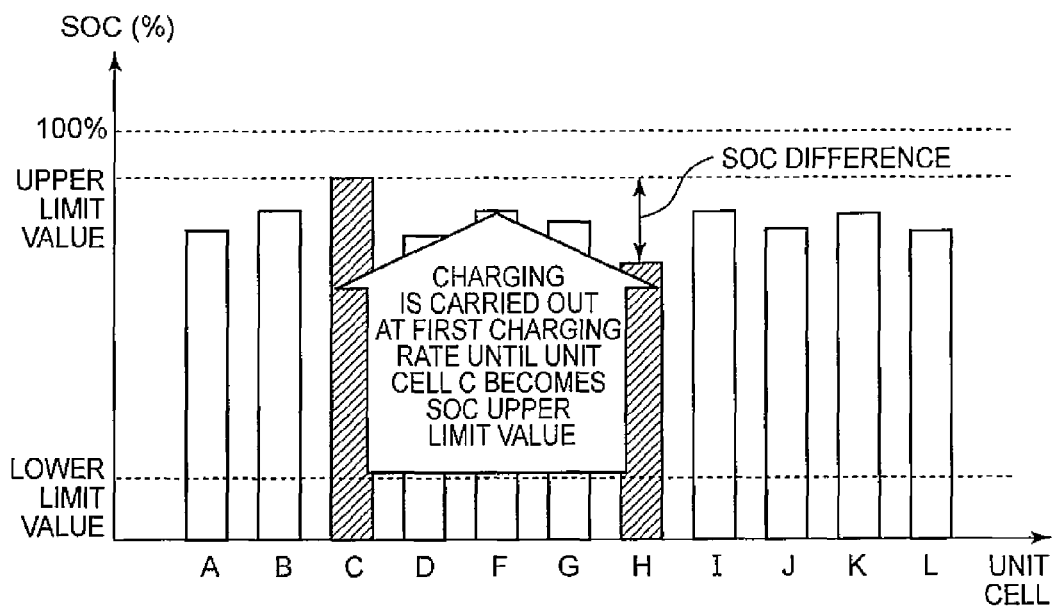
FIG. 4 is a graph for illustrating external charging control up to an SOC upper limit value.

In charging control, the controller 30 stops charging when any one of the unit cells 11 has reached the SOC upper limit value (corresponding voltage value). FIG. 4 is a graph for illustrating external charging control up to the SOC upper limit value. As shown in FIG. 4, when charging is carried out at a predetermined charging rate, the unit cell C reaches the SOC upper limit value first. Because charging is stopped when the unit cell C reaches the SOC upper limit value, the other unit cells 11 including the unit cell H stop being charged before reaching the SOC upper limit value, and are charged only to an SOC lower than the SOC upper limit value. Therefore, there is a variation in SOC between the unit cell C and the unit cell H. The controller 30 is able to identify the unit cell C as the unit cell 11 having the highest SOC.

On the other hand, as shown in FIG. 3, in discharging control, the controller 30 stops discharging when any one of the unit cells 11 has reached the SOC lower limit value (corresponding voltage value). For example, in the example of FIG. 2, the unit cell H reaches the SOC lower limit value first. At this time, the unit cell H may be identified as the unit cell 11 having the lowest SOC.

That is, because discharging is carried out in a state where there is an SOC difference between the unit cell C and the unit cell H, the unit cell H having a lower SOC than the unit cell C reaches the SOC lower limit value earlier than the unit cell C. When the unit cell H reaches the SOC lower limit value, discharging of the battery pack 10 is stopped. Therefore, discharging of the other unit cells 11 including the unit cell C is stopped although the other unit cells 11 have SOCs higher than the SOC lower limit value (store the dischargeable amount of electric power).

In this way, in the stationary electrical storage system that is used in the wide SOC range of 10 to 90%, the influence of a difference in charging efficiency among the unit cells 11 increases as compared to that of the vehicle battery, and variations in SOC easily become large, with the result that the SOC usage range of the battery pack 10 tends to reduce due to aging through repeated charging and discharging. Particularly, when the unit cells 11 that are used in the battery pack 10 are recycled used unit cells 11, it is difficult to avoid an increase in variations in SOC due to the influence of a difference in charging efficiency among the unit cells 11, so there is a concern that it is not possible to sufficiently exercise the battery performance of the stationary electrical storage system 1.

In the present embodiment, in order to suppress a reduction in the SOC usage range of the stationary electrical storage system 1, an SOC difference that occurs due to variations in charging efficiency among the unit cells 11 is eliminated by carrying out refresh charging during external charging, thus making it possible to sufficiently exercise the battery performance of the stationary electrical storage system 1 having the large SOC usage range.

Refresh charging is carried out in external charging control, and is to eliminate variations in SOC among the unit cells 11 by carrying out additional charging in addition to normal external charging control in charging and discharging control in the usage range of the above-described SOC upper limit value (which corresponds to a second threshold) and the SOC lower limit value (which corresponds to a first threshold).

In the present embodiment, as described above, a mode in which refresh charging is carried out in the case where the SOC difference between the unit cell C having the highest SOC and the unit cell H having the lowest SOC, which are identified in charging and discharging control, exceeds a predetermined value will be described as an example. This is to periodically eliminate a reduction in SOC usage range due to variations in SOC by carrying out additional charging when the SOC difference is larger than or equal to a predetermined value as a trigger of additional charging so that it is possible to appropriately maintain the battery performance of the stationary electrical storage system.

Additional charging according to the present embodiment may be, for example, configured to be automatically carried out at predetermined timing (for example, once a month) without considerations for an SOC difference or to be carried out in response to forcible input operation (for example, ON operation of an SOC variation elimination button) conducted by a user, a worker, or the like, in maintenance work, or the like, for the stationary electrical storage system 1.

Initially, as shown in FIG. 4, the controller 30 carries out charging at a first charging rate until the SOC of any one of the unit cells 11 reaches the SOC upper limit value while monitoring the voltage of each of the unit cells 11 that constitute the battery pack 10 in normal charging control over the battery pack 10 via the external power supply 60.

Subsequently, when the controller 30 carries out refresh charging (when the SOC difference is larger than the predetermined value), the controller 30 does not stop charging even when any one SOC has reached the SOC upper limit value but continues charging at a second charging rate. Charging in which charging is allowed and continued until all the unit cells 11 reach the fully charged level (100%) beyond the SOC upper limit value is the refresh charging (additional charging).

Figure 5:
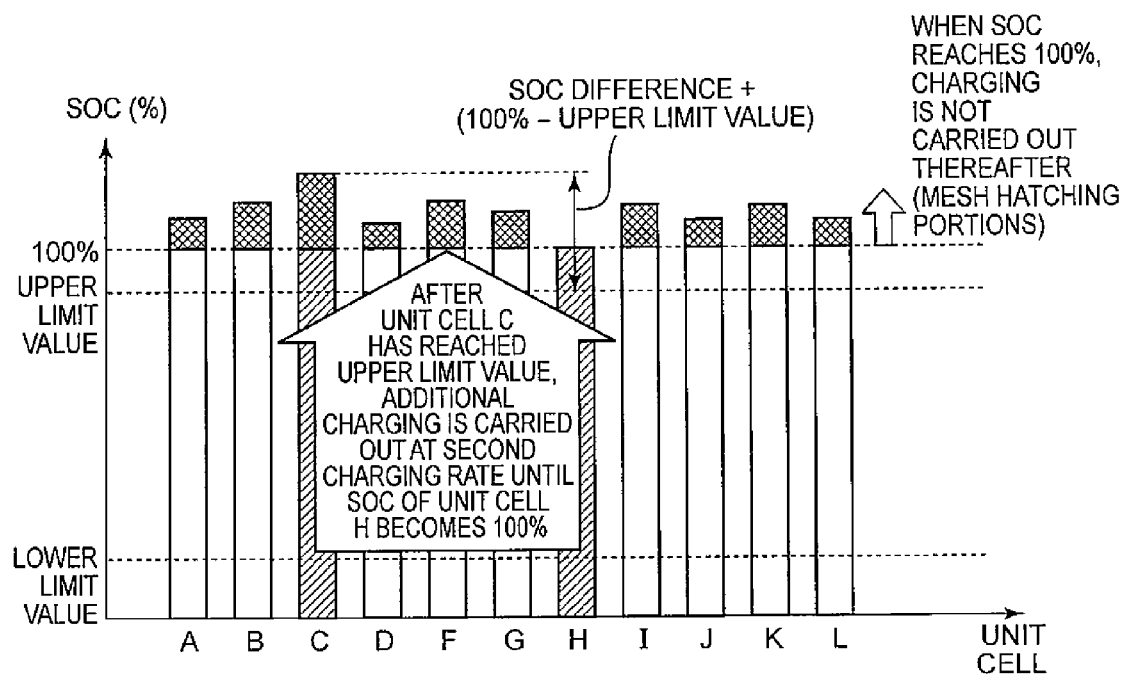
FIG. 5 is a graph for illustrating a mode in which the SOC of each unit cell is equalized through refresh charging.

As shown in FIG. 5, after the SOC of each unit cell 11 has reached the SOC upper limit value, each unit cell 11 is further charged with the amount of electric power corresponding to "100%–SOC upper limit value" to the fully charged level (the SOC of 100%). At this time, even when the unit cell C has reached the SOC upper limit value, there is an SOC difference between the unit cell C and the unit cell H, so the unit cell H is further charged with the amount of electric power corresponding to the SOC difference in addition to the amount of electric power corresponding to "100%–SOC upper limit value". In the example of FIG. 5, regions indicated by mesh hatching indicate overcharged regions beyond the fully charged level.

The other unit cells 11 other than the unit cell C each are also similarly further charged with the amount of electric power corresponding to the SOC difference with respect to the unit cell H in addition to the amount of electric power corresponding to "100%–SOC upper limit value", and undergo additional charging until the unit cell H having the lowest SOC reaches the fully charged level.

Each of the unit cells 11 other than the unit cell H is charged with the amount of electric power beyond the fully charged level (100%) to become an overcharged state; however, when the unit cell H having the lowest SOC reaches the fully charged level, all the unit cells 11 are equalized at the fully charged level (100%), so it is possible to execute next discharging control in a state where variations in SOC among the unit cells 11 are eliminated. Therefore, it is possible to suppress a reduction in the usage range up to the SOC lower limit value. Furthermore, charging control is carried out up to the SOC upper limit value in a state where variations in SOC are eliminated in the next charging control after discharging control, so it is possible to suppress a reduction in the usage range up to the SOC upper limit value.

The second charging rate is set so as to be lower than the first charging rate. For example, the first charging rate may be set to 5 to 10 A, and the second charging rate may be set to a low rate of 1 to 2 A. The second charging rate may be set as needed on the basis of the amount of heat generated at the time of overcharging of each of the nickel metal hydride (Ni-MH) secondary batteries that are used as the unit cells 11.

In each nickel metal hydride secondary battery, during charging, normally, the reaction "$Ni(OH)_2 + OH^- \rightarrow NiOOH + H_2O + e^-$" occurs at the positive electrode side, and the reaction "$M^+H_2O + e^- \rightarrow MH + OH^-$" occurs at the negative electrode side". As a whole, the reaction "$Ni(OH)_2 + M \rightarrow NiOOH + MH$" occurs, and, during discharging, the reaction advances in the direction opposite to that during charging. "M" is a hydrogen storage alloy.

Together with such chemical reactions, during overcharging, the reaction "$OH^- \rightarrow \frac{1}{2}H_2O + \frac{1}{4}O_2\uparrow + e^-$" occurs at the positive electrode side, and the reaction "$M + H_2O + e^- \rightarrow MH + OH^-$" and the reaction "$MH_x \rightarrow M + X/2 H_2\uparrow$" occur at the negative electrode side. These reactions during overcharging (the SOC is higher than or equal to the SOC upper limit value) also partially occur during normal charging, and, during overcharging (the SOC is higher than or equal to 100%), only these reactions during overcharging occur.

In overcharging at the SOC upper limit value or higher, inside each nickel metal hydride secondary battery, hydrogen in the hydrogen storage alloy reduces oxygen gas, and hydrogen is directly stored due to the water repellency of the hydrogen storage alloy. This recombination reaction causes an exothermic reaction like "$2H_2 + O_2 \rightarrow 2H_2O + Q$ (heat generation)" as a whole.

This heat generation occurs in a region in which the SOC exceeds the SOC upper limit value. That is, part of electric energy supplied in order to charge the secondary battery is not used for charging but converted to thermal energy. The second charging rate may be set to a low rate so as not to exceed a predetermined heat generation allowable value for each unit cell 11 in response to the heat generation, and may be configured such that each unit cell 11 is allowed to be charged to beyond the corresponding fully charged level (overcharged). With this configuration, it is possible to appropriately carry out charging up to the fully charged level beyond the SOC upper limit value while suppressing heat generation of each nickel metal hydride secondary battery due to overcharging.

In addition, as described above, after the stop of discharging, the SOC difference between the unit cell 11 that has reached the SOC lower limit value (the unit cell 11 having the charged level of the SOC lower limit value) and the unit cell 11 that has reached the SOC upper limit value in the last charging control (the unit cell 11 having the charged level of the SOC upper limit value at the start of discharging) is calculated and, when the SOC difference exceeds the threshold, it is possible to carry out refresh charging in charging control after the stop of discharging.

At this time, in the present embodiment, at the time of calculating the SOC difference, the current SOC of each of the unit cells 11 having the charged level of the SOC upper limit value is calculated by using the discharging current accumulated value.

Figure 6:
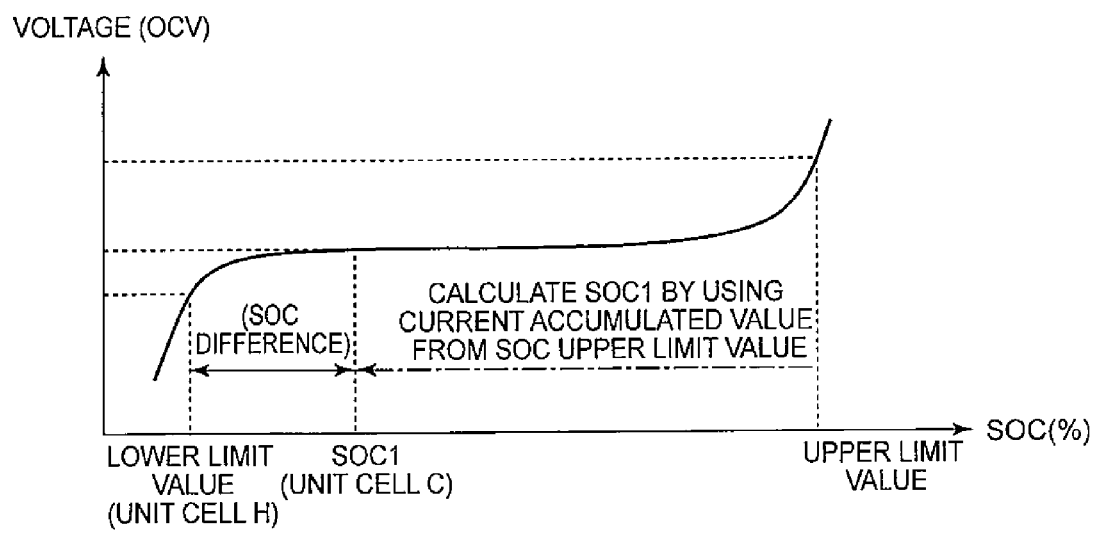
FIG. 6 is a graph that shows an example of an SOC-OCV map for a nickel metal hydride secondary battery.

FIG. 6 is a graph that shows an example of the SOC-OCV map for the nickel metal hydride secondary battery. As shown in FIG. 6, the unit cell 11 that reaches the SOC lower limit value as a trigger for stopping discharging is subjected to determination as to whether the unit cell 11 has reached the SOC lower limit value with the use of the SOC-OCV map on the basis of the detected value of the voltage sensor 20. That is, when the voltage value corresponding to the preset SOC lower limit value has been reached, discharging is stopped, so the SOC of the unit cell 11 that reaches the SOC lower limit value is the SOC lower limit value.

On the other hand, the current SOC of each of the unit cells 11 having the charged level of the SOC upper limit value at the time of stopping discharging, as well as the SOC of the unit cell 11 that reaches the SOC lower limit value, can be calculated from the SOC-OCV map by using the detected value of the voltage sensor 20. However, as shown in FIG. 6, in the SOC-OCV map, if there is a region in which a voltage variation is small with respect to a variation amount in SOC (for example, a region in which the percentage of a voltage variation with respect to a variation amount in SOC is close to 0), there is a concern that it is not possible to calculate an accurate SOC in this region.

In the present embodiment, by utilizing the fact that the SOC at the time of the start of discharging before refresh charging is the SOC upper limit value, a current SOC1 of the unit cell 11 having the charged level of the SOC upper limit value, identified in charging control before the start of discharging, is calculated by using the discharging current accumulated value in a discharging period of time from the start of discharging to the end of discharging. It is possible to calculate the charged level (Ah) of the SOC upper limit value from the fully charged level (Ah), so it is possible to calculate the current SOC1 by subtracting the discharging current accumulated value (Ah) from the charged level (Ah) of the SOC upper limit value. With this configuration, it is possible to accurately calculate the current SOC1 of the unit cell 11 having, the charged level of the SOC upper limit value, identified in charging control before the start of discharging.

Figure 7:
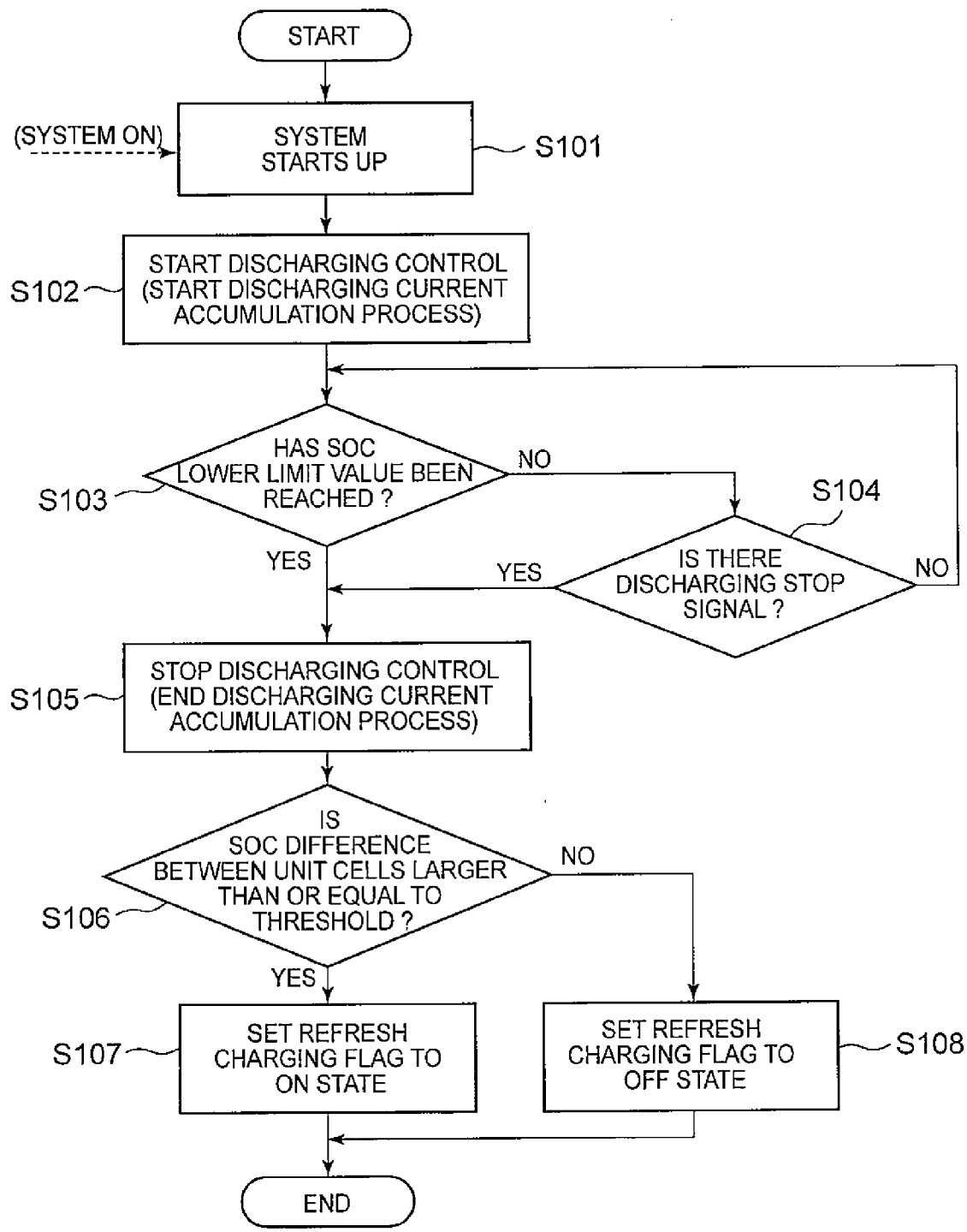
FIG. 7 is a view that shows the control flow of a refresh charging determination process for the stationary electrical storage system.

FIG. 7 is a view that shows the control flow of a refresh charging determination process for the stationary electrical storage system 1. The refresh charging determination process is executed by the controller 30, and may be executed at predetermined timing at the time of the stop of discharging or after the stop of discharging.

As shown in FIG. 7, the controller 30 starts up the stationary electrical storage system 1 on the basis of an automatically or manually input system ON signal (S101).

The controller 30 connects the battery pack 10 with the load 50 by switching the relay devices R1a, R2a from the off state to the on state. At this time, the relay devices R1b, R2b remain in the off state.

The controller 30 starts discharging control after the battery pack 10 is connected to the load 50. The controller 30 starts a current accumulation process in accordance with the start of discharging control on the basis of the current value that is detected by the current sensor 21 (S102).

The controller 30 determines whether any one of the unit cells 11 has reached the SOC lower limit value (S103). The controller 30 monitors the unit cell 11 that reaches the SOC lower limit value as a trigger for stopping discharging on the basis of the voltage values that are detected by the voltage sensor 20, and stops discharging when any one of the unit cells 11 has become the voltage value corresponding to the preset SOC lower limit value (S105). With the stop of discharging, the controller 30 ends the current accumulation process, and disconnects the battery pack 10 from the load 50 by switching the relay devices R1a, R2a from the on state to the off state. In addition, the controller 30 identifies the unit cell 11 (which corresponds to a first unit cell) that has reached the SOC lower limit value.

The trigger for stopping discharging is not only the case where the SOC of the unit cell 11 reaches the SOC lower limit value but also, for example, the case where the user or the worker manually stops discharging or discharging is forcibly stopped due to a system abnormality, or the like. Thus, in the example of FIG. 7, in step S104, when the SOC lower limit value is not reached (NO in S103), the controller 30 is able to check for a discharging stop signal and to stop or continue discharging.

Subsequently, the controller 30 executes the refresh charging determination process at the time of the stop of discharging control or after the stop of discharging control (S106). The controller 30 calculates the current SOC1 of each of the unit cells 11 having the charged level of the SOC upper limit value, identified in charging control before the start of discharging by using the discharging current accumulated value in the discharging period of time from the start of discharging to the end of discharging. The current SOC1 is calculated by subtracting the discharging current accumulated value (Ah) from the charged level (Ah) of the SOC upper limit value. Identification information about each of the unit cells 11 having the charged level of the SOC upper limit value is identified in charging control before the start of discharging and is stored in the memory 31.

The controller 30 calculates a difference (SOC difference) between the current SOC1 of the second unit cell 11 and the SOC lower limit value. When the SOC difference is larger than or equal to the predetermined value, a refresh charging flag is set to an on state (S107), and is stored in the memory 31. On the other hand, when the SOC difference is smaller than the predetermined value, the refresh charging flag is set to an off state (S107), and is stored in the memory 31. The predetermined value in the refresh charging determination may be preset for the SOC usage range required to sufficiently exercise the battery performance of the stationary electrical storage system 1. For example, the difference between the fully charged level (100%) and the SOC upper limit value (second threshold) may be set as the predetermined value.

Figure 8:
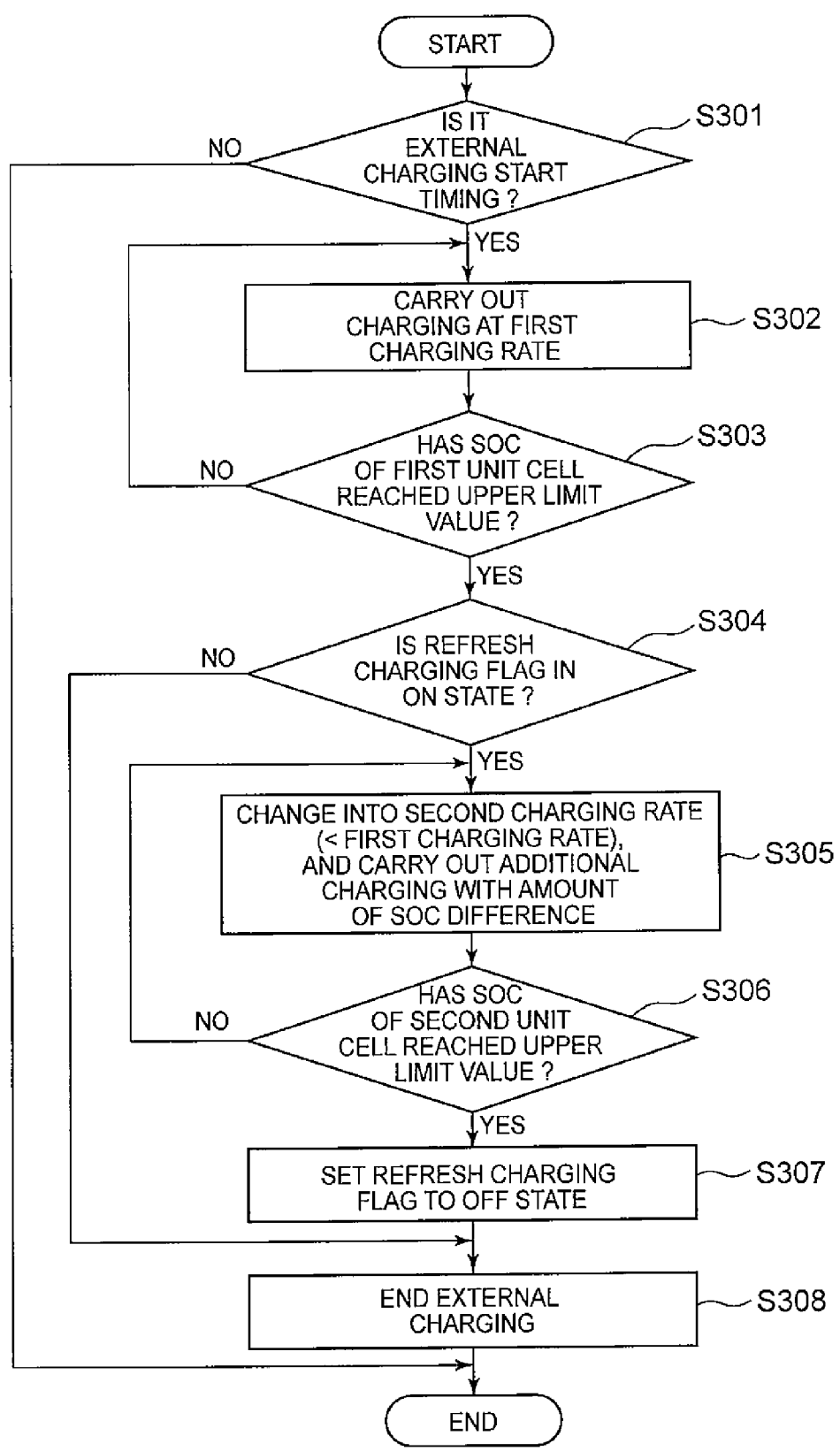
FIG. 8 is a view that shows the control flow of an external charging process.

FIG. 8 is a view that shows the control flow of the external charging process. The external charging process is executed by the controller 30, and is, for example, executed at predetermined timing at which midnight electric power can be supplied from the external power supply 60.

As shown in FIG. 8, the controller 30 determines whether it is the start timing of external charging, and, when it is the start timing (S301), proceeds with the process to step S302, and starts external charging. For example, when time measured by a timer (not shown) is preset time at which midnight electric power can be supplied, external charging is started.

The controller 30 connects the battery pack 10 to the external power supply 60 by switching the relay devices R1*b*, R2*b* from the off state to the on state. At this time, the relay devices R1*a*, R2*a* remain in the off state. The controller 30 starts charging control after the battery pack 10 is connected to the external power supply 60. The controller 30 starts the process of accumulating the external charging current value on the basis of the current value that is detected by the current sensor 21.

In step S302, the controller 30 carries out charging at the first charging rate. The controller 30 monitors the unit cell 11 that reaches the SOC upper limit value on the basis of the voltage values that are detected by the voltage sensor 20 during charging control at the first charging rate, and determines the unit cell 11 that has become the voltage value corresponding to the preset SOC upper limit value (S303).

The controller 30 continues charging control at the first charging rate when no unit cell 11 that has become the voltage value corresponding to the preset SOC upper limit value has been detected. The controller 30 proceeds with the process to step S304 and checks whether the refresh charging flag is in the on state or the off state when the unit cell 11 that has become the voltage value corresponding to the SOC upper limit value has been detected.

When the refresh charging flag is in the off state, the controller 30 proceeds with the process to step S308, and ends external charging. On the other hand, when the refresh charging flag is in the on state, the charging rate is changed to the second charging rate lower than the first charging rate, and additional charging is carried out at the second charging rate (S305).

At this time, the controller 30 is able to calculate electric power required for additional charging in advance and to execute control such that charging is carried out with the calculated electric power at the time of carrying out charging at the second charging rate. As in the example of FIG. 5, a total amount of electric power, that is, the sum of an electric power corresponding to the SOC difference between the first unit cell 11 that has reached the SOC lower limit value in current discharging control and the second unit cell 11 that has reached the SOC upper limit value in charging control before the current discharging control and the amount of electric power corresponding to "100%–SOC upper limit value", is calculated as an additional charging amount that is used in refresh charging. The controller 30 variably controls the calculated additional charging amount on the basis of the SOC difference between the first unit cell 11 and the second unit cell 11 and executes control such that extra charging is carried out with the additional charging amount in addition to the normal external charging amount (the charging amount until the SOC of the first unit cell 11 reaches the SOC upper limit value).

By variably controlling electric power required for refresh charging that is carried out during external charging in this way, it is possible to reduce an increase in the temperature of each unit cell 11 due to external charging by suppressing excessive charging while supplying electric power for equalizing the SOC of each unit cell 11 through refresh charging in just proportion.

In step S306, the controller 30 monitors whether the SOC of the first unit cell 11 has become the voltage value corresponding to the fully charged level (100%) as shown in the example of FIG. 6 on the basis of the voltage value that is detected by the voltage sensor 20 during charging control at the second charging rate.

The controller 30 continues charging control at the second charging rate when the first unit cell 11 has not become the voltage value corresponding to the fully charged level (100%), and, when the first unit cell 11 has become the voltage value corresponding to the fully charged level (100%), proceeds with the process to step S307, sets the refresh charging flag to the off state, and further proceeds with the process to step S308 and ends external charging at the second charging rate. At this time, as described above, when the accumulated value of the external charging current has reached the total value of the external charging amount up to the SOC upper limit value and the calculated additional charging amount, the controller 30 may execute control such that external charging including refresh charging ends.

In the above description, an example in which the refresh charging determination process shown in FIG. 7 is carried out at the time of the end of discharging control is described; however, the invention is not limited to this configuration. For example, the SOC difference may be calculated and determined by using the discharging current accumulated value obtained in discharging control in the external charging process shown in FIG. 8, or it may be determined in the external charging process shown in FIG. 8 by using the SOC difference calculated in FIG. 7 whether refresh charging is required.

In the present embodiment, charging is not stopped in charging control with the use of the external power supply but the battery pack 10 (which corresponds to a stationary storage battery) is additionally charged until the fully charged level (100%) beyond the SOC upper limit value is reached without stopping charging in charging control at predetermined timing, so it is possible to equalize the SOC of each of the unit cells 11 formed of the nickel metal hydride secondary batteries at the fully charged level, and it is possible to eliminate variations in SOC.

The above description describes an example in which additional charging is carried out such that all the unit cells 11 are charged to the fully charged level beyond the SOC upper limit value. Instead, by additionally charging the whole battery pack 10 such that the SOC of the unit cell 11 having the lowest SOC becomes higher than or equal to the SOC upper limit value, it is possible to reduce an SOC variation range within the range of the fully charged level and the SOC upper limit value, and it is possible to suppress a decrease in the battery performance of the stationary electrical storage system 1.

That is, charging at the SOC upper limit value or higher, for example, is carried out in the overcharged region close to the fully charged level, so the charging efficiency at the SOC upper limit value or higher reduces. Thus, by additionally charging the whole battery pack 10 such that the unit cell 11 having the lowest SOC becomes higher than or equal to the SOC upper limit value, the SOC of each of the unit cells 11 falls within the range between the fully charged level and the SOC upper limit value, and the span of variations in SOC reduces such that variations in SOC are eliminated. Particularly, as in the case of the present embodiment, when the SOC usage range is large, the difference between the fully charged level and the SOC upper limit value is small. Therefore, when additional charging is carried out such that the SOC of the unit cell 11 having the lowest SOC becomes higher than or equal to the SOC upper limit value, it is possible to further reduce the span of variations in SOC such that variations in SOC are eliminated.

What is claimed is:

1. A stationary electrical storage system comprising:
a stationary storage battery including a plurality of nickel metal hydride secondary batteries connected in series with each other and configured to supply electric power to a load;
a controller configured to repeatedly execute charging control with the use of an external power supply and discharging control in order to supply electric power to the load, the controller being configured to stop discharging the stationary storage battery to the load when a state of charge (SOC) of any one of the nickel metal hydride secondary batteries has become a first threshold, the controller being configured to stop charging the stationary storage battery from the external power supply when an SOC of any one of the nickel metal hydride secondary batteries has become a second threshold, wherein
the controller is configured to additionally charge the whole stationary storage battery in charging control with the use of the external power supply such that:
the nickel metal hydride secondary battery other than the nickel metal hydride secondary battery having the lowest SOC is allowed to be charged to a fully charged level beyond the second threshold by not stopping charging when the SOC of the any one of the nickel metal hydride secondary batteries has become the second threshold; and
the SOC of the nickel metal hydride secondary battery having the lowest SOC becomes higher than or equal to the second threshold;
a voltage sensor configured to detect a voltage value of each of the nickel metal hydride secondary batteries; and
a current sensor configured to detect a current value flowing through the nickel metal hydride secondary batteries, wherein
the controller is configured to determine the first nickel metal hydride secondary battery that has reached a voltage value corresponding to the first threshold on the basis of a prescribed correspondence map between the SOC of each nickel metal hydride secondary battery and the voltage value, and to stop discharging,
the controller is configured to determine the second nickel metal hydride secondary battery that has reached a voltage value corresponding to the second threshold on the basis of the correspondence map, and to stop charging, and
the controller is configured to additionally charge the whole stationary storage battery when an SOC difference between the first nickel metal hydride secondary battery and the second nickel metal hydride secondary battery is larger than or equal to a predetermined value.

2. The stationary electrical storage system according to claim 1, wherein
the controller is configured to additionally charge the whole stationary storage battery until the SOC of the nickel metal hydride secondary battery having the lowest SOC reaches the fully charged level beyond the second threshold.

3. The stationary electrical storage system according to claim 1, wherein the controller is configured to carry out charging at a first charging rate until the SOC of the nickel metal hydride secondary batteries becomes the second threshold in the charging control, and
the controller is configured to carry out charging at a second charging rate lower than the first charging rate from when the SOC of the nickel metal hydride secondary batteries has become the second threshold to when the SOC of the nickel metal hydride secondary battery reaches the fully charged level.

4. The stationary electrical storage system according to claim 1, wherein
the controller is configured to calculate the SOC of the second nickel metal hydride secondary battery at the time when the SOC of the first nickel metal hydride secondary battery has reached the first threshold on the basis of a charging and discharging current accumulated value from when discharging is started to when the SOC of the first nickel metal hydride secondary battery reaches the first threshold in the discharging control.

5. The stationary electrical storage system according to claim 1, wherein
the controller is configured to additionally charge the whole stationary storage battery such that the second nickel metal hydride secondary battery is charged with an amount of electric power corresponding to the SOC difference after the second nickel metal hydride secondary battery has been charged to the second threshold.

6. A control method for a stationary storage battery including a plurality of nickel metal hydride secondary batteries connected in series with each other and configured to supply electric power to a load, comprising:
executing discharging control to the load, and stopping discharging the stationary storage battery to the load when a state of charge (SOC) of any one of the nickel metal hydride secondary batteries has become a first threshold;
executing charging control with the use of an external power supply, and stopping charging the stationary storage battery from the external power supply when an SOC of any one of the nickel metal hydride secondary batteries has become a second threshold;
repeatedly executing the charging control with the use of the external power supply and the discharging control in order to supply electric power to the load; and
additionally charging the overall stationary storage battery in the charging control such that:
the nickel metal hydride secondary battery other than the nickel metal hydride secondary battery having the lowest SOC is allowed to be charged to a fully charged level beyond the second threshold by not stopping charging when the SOC of the any one of the nickel metal hydride secondary batteries has become the second threshold; and
the SOC of the nickel metal hydride secondary battery having the lowest SOC becomes higher than or equal to the second threshold;
detecting, using a voltage sensor, a voltage value of each of the nickel metal hydride secondary batteries; and
detecting, using a current sensor, a current value flowing through the nickel metal hydride secondary batteries, wherein
based upon determining the first nickel metal hydride secondary battery has reached a voltage value corresponding to the first threshold on the basis of a prescribed correspondence map between the SOC of each nickel metal hydride secondary battery and the voltage value, stop discharging, based upon determining the second nickel metal hydride secondary battery has reached a voltage value corresponding to the second threshold on the basis of the correspondence map, stop charging, and additionally charge the whole stationary storage battery when an SOC difference between the first nickel metal hydride secondary battery and the second nickel metal hydride secondary battery is larger than or equal to a predetermined value.

\* \* \* \* \*